(12) United States Patent
Wu et al.

(10) Patent No.: US 8,269,470 B2
(45) Date of Patent: Sep. 18, 2012

(54) MECHANICAL FLOW BATTERY

(75) Inventors: Whei Chyou Wu, Fremont, CA (US);
Yen-Wei Hsu, Taipei (TW)

(73) Assignees: Yen-Wei Hsu, Taipei (TW); Whei Chyou Wu, Fremont, CA (US)

( * ) Notice: Subject to any disclaimer, the term of this patent is extended or adjusted under 35 U.S.C. 154(b) by 651 days.

(21) Appl. No.: 12/167,253

(22) Filed: Jul. 3, 2008

(65) Prior Publication Data
US 2010/0001697 A1  Jan. 7, 2010

(51) Int. Cl.
*H02K 7/02* (2006.01)
(52) U.S. Cl. ............................. 322/4; 290/1 R; 290/4 A
(58) Field of Classification Search ...... 322/4; 290/1 A, 290/1 R; 74/572; 310/74; 416/60; 60/330, 60/335
See application file for complete search history.

(56) References Cited

U.S. PATENT DOCUMENTS

| | | | | |
|---|---|---|---|---|
| 2,376,421 A * | 5/1945 | Drake | ............................... | 322/9 |
| 4,035,659 A * | 7/1977 | Jeppson | ........................... | 307/84 |
| 4,525,661 A * | 6/1985 | Mucsy et al. | ...................... | 322/4 |
| 6,043,577 A * | 3/2000 | Bornemann et al. | ............ | 310/74 |
| 6,231,011 B1 * | 5/2001 | Chu et al. | ....................... | 244/165 |
| 6,707,187 B1 * | 3/2004 | Gabrys | ........................... | 310/74 |
| 7,541,783 B2 * | 6/2009 | Kurosawa | ........................ | 322/4 |
| 2010/0282528 A1 * | 11/2010 | Palti | ............................. | 180/65.1 |

FOREIGN PATENT DOCUMENTS

JP  57202850 A  * 12/1982

* cited by examiner

*Primary Examiner* — Julio Gonzalez

(57) ABSTRACT

A mechanical flow battery comprises a flywheel system in which a spinning axis can be driven by an air-powered motor and the structure of the gyroscope is employed in the mechanical flow battery. The structure of the gyroscope can be constructed by coupling the housing of the flywheel system with a nutation frame which couples a precession frame so that the spinning axis in the flywheel can be isolated from any outside gyroscopic torque.

14 Claims, 5 Drawing Sheets

MECHANICAL FLOW BATTERY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF PARTIES TO A JOINT RESEARCH AGREEMENT OK TO ENTER

Not Applicable

BACKGROUND OF THE INVENTION

1. Field of the Invention

The present invention relates to an electrical generator and battery, and, more particularly, a mechanical flow battery. The mechanical flow battery comprises a flywheel and has the structure of gyroscope so that the spinning axis inside the flywheel system can be isolated from any outside gyroscopic forces. The present invention also relates to a variable-volume-controlled container as an air source to drive the spinning axis inside mechanical flow battery.

2. Description of Related Art

Flywheel system has been known to us for many years. Flywheel system works by accelerating a rotor inside the flywheel to a very high speed and maintaining the energy in the system as rotational energy. The energy is converted back by slowing down the rotor. The high-speed rotor is sensitive to any outside angular momentum, which limits the flywheel system to be placed on a moving platform. The structure of gyroscope is employed to solve the problem.

A typical flywheel system is briefly introduced first. FIG. 1 has shown a typical flywheel system in cross view and it comprises a motor 102, a rotor 101, a spinning axis 106, at least a permanent magnet 107, a plurality of bearings 110, at least a conductive coil 149 and a housing 113. The motor 102, the bearings 110 and the conductive coils 149 are fixed with the housing 113. The rotor 101 and the permanent magnet or magnets 107 fix with the spinning axis 106 which is positioned by the bearings 110 and which is driven by the motor 102. The rotor 101 and the permanent magnet or magnets 107 rotate when the spinning axis 106 rotates.

Due to the extremely high rotating speed of the spinning axis 106 and in order to reduce the aerodynamic loss and frictional loss, the housing 113 containing the spinning axis 106 is always highly vacuumed, and noncontact, magnetic bearings are employed. The motor 102 is used to rotate the spinning axis 106 and it might go thru a gear box and an one-way clutch to the spinning axis 106. The gear box is for compensating the differences between the motor and spinning axis, for example, the differences could be their sizes of the spinning things, their speeds or even their centerings. The one-way clutch is used to let the motor 102 drive the spinning axis 106 and prohibit the spinning axis 106 from driving the motor 102. The gear box and the one-way clutch can be neglected if there are not needed. When the spinning axis 106 rotates the conductive coils 149 on the housing 113 output electricity. The permanent magnet or magnets 107 can also be realized by an input current flowing thru the conductive coil or coils. The gearbox and one-way clutch are not shown in FIG. 1. The typical flywheel system is a known technology for years so that it will not be explained too much here.

The structure of a typical gyroscope is briefly introduced in FIG. 3 which is found on the website of Wikipedia. A typical gyroscope shown in FIG. 3 includes a spinning frame, a nutation frame 372 and a precession frame 373. The spinning frame defined by a spinning axis 306 which is held by a frame 313 and which is fixed with a rotor 301. The rotor 301 rotates when the spinning axis 306 rotates. As we know that the rotating rotor 301 can be isolated from any gyroscopic torque by the structure of gyroscope. The principle and structure of the gyroscope has been known to us for years.

BRIEF SUMMARY OF THE INVENTION

It is a first objective of the present invention to provide a mechanical flow battery which can be fixed on a moving platform.

It is a second objective of the present invention to provide an air-powered motor for driving a spinning axis of the mechanical flow battery.

It is a third objective of the present invention to provide a variable-volume-controlled container as an air source to drive the air-powered motor of the mechanical flow battery.

DETAILED DESCRIPTION OF THE INVENTION

The present invention "a mechanical flow battery" can be fixed on a moving platform as a power generator and battery. The mechanical flow battery comprises a flywheel system in which a high-speed rotating rotor is sensitive to angular momentum so that it has to be isolated from any outside gyroscopic torque. The invention has employed the structure of gyroscope to solve the problems.

Figure 1:
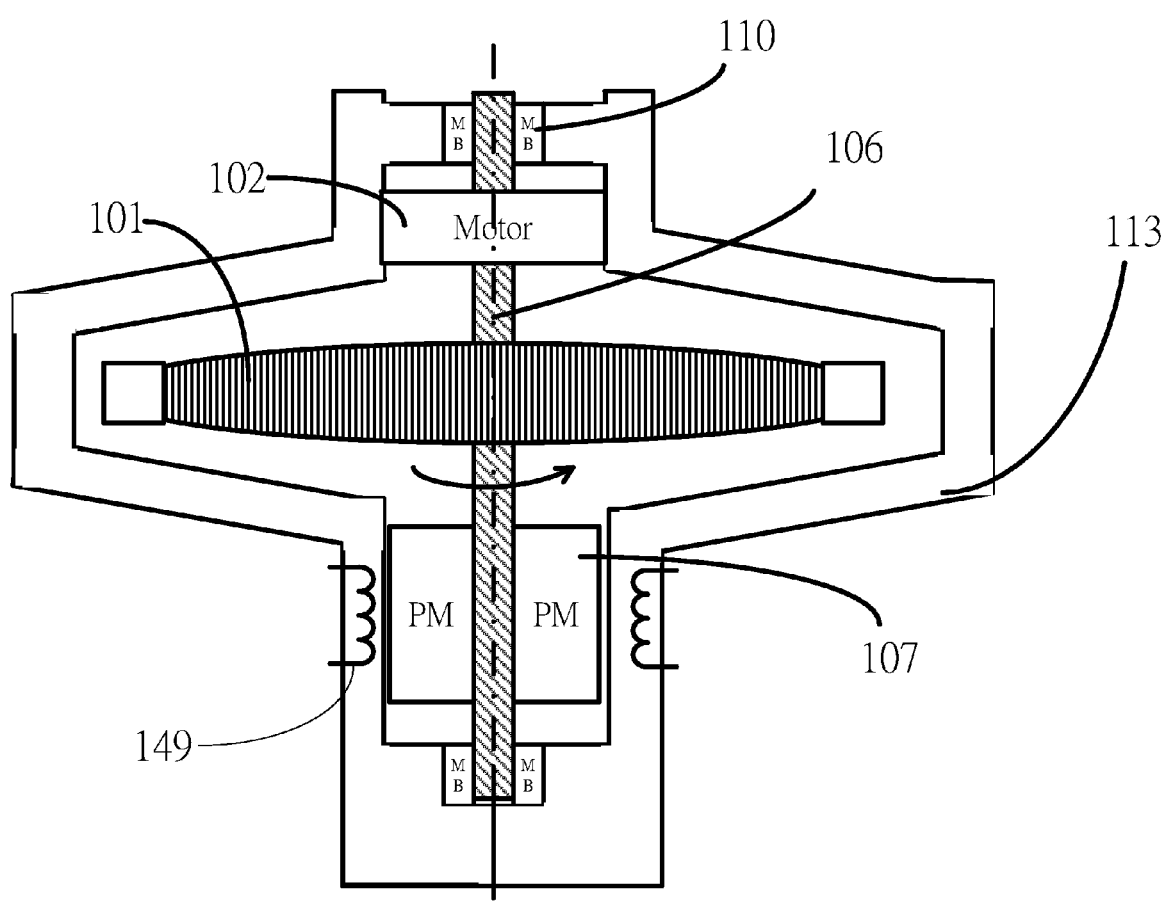
FIG. 1 has shown a typical flywheel in cross view.
Figure 2:
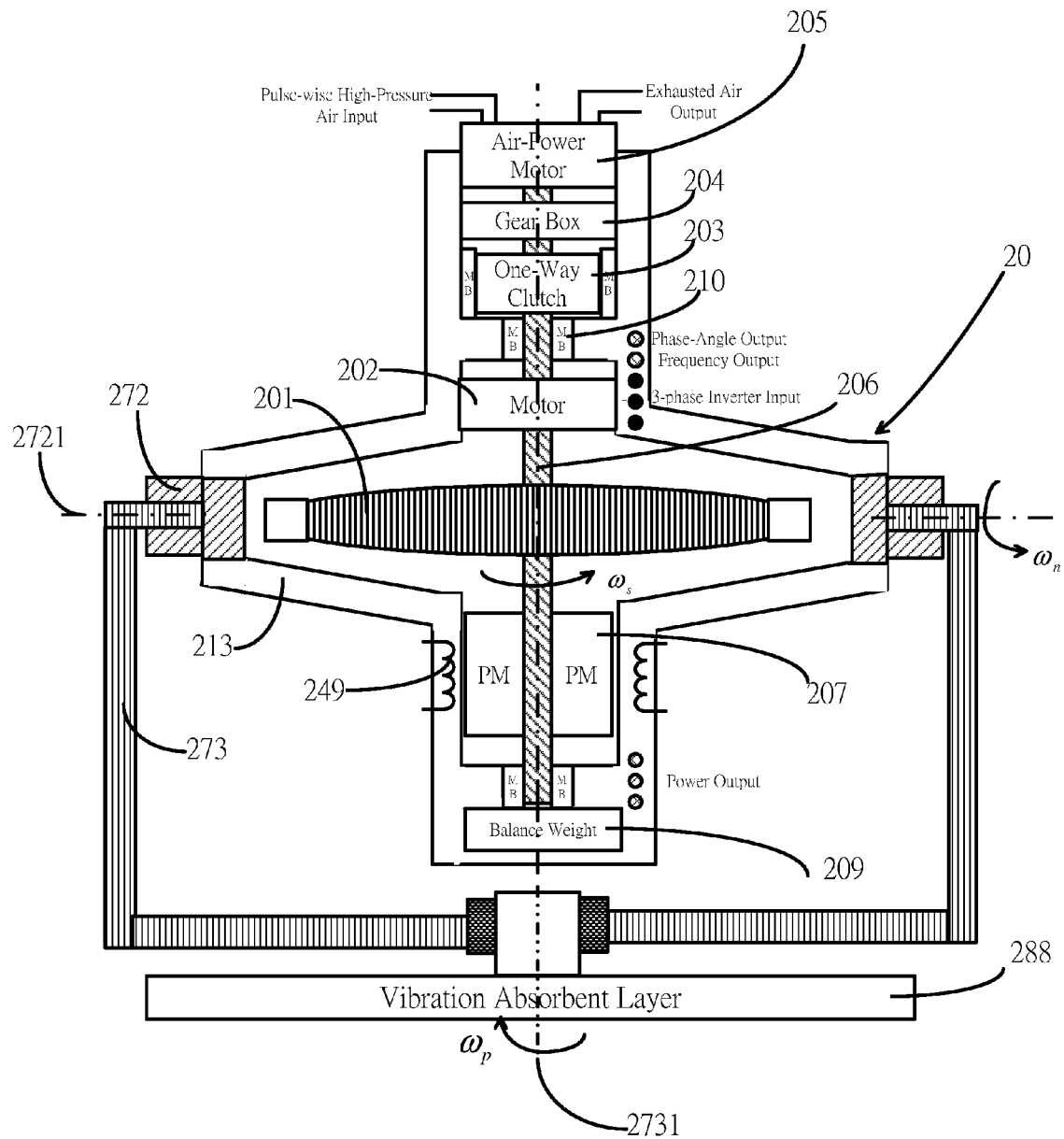
FIG. 2 has shown a flow battery in cross view.
Figure 3:
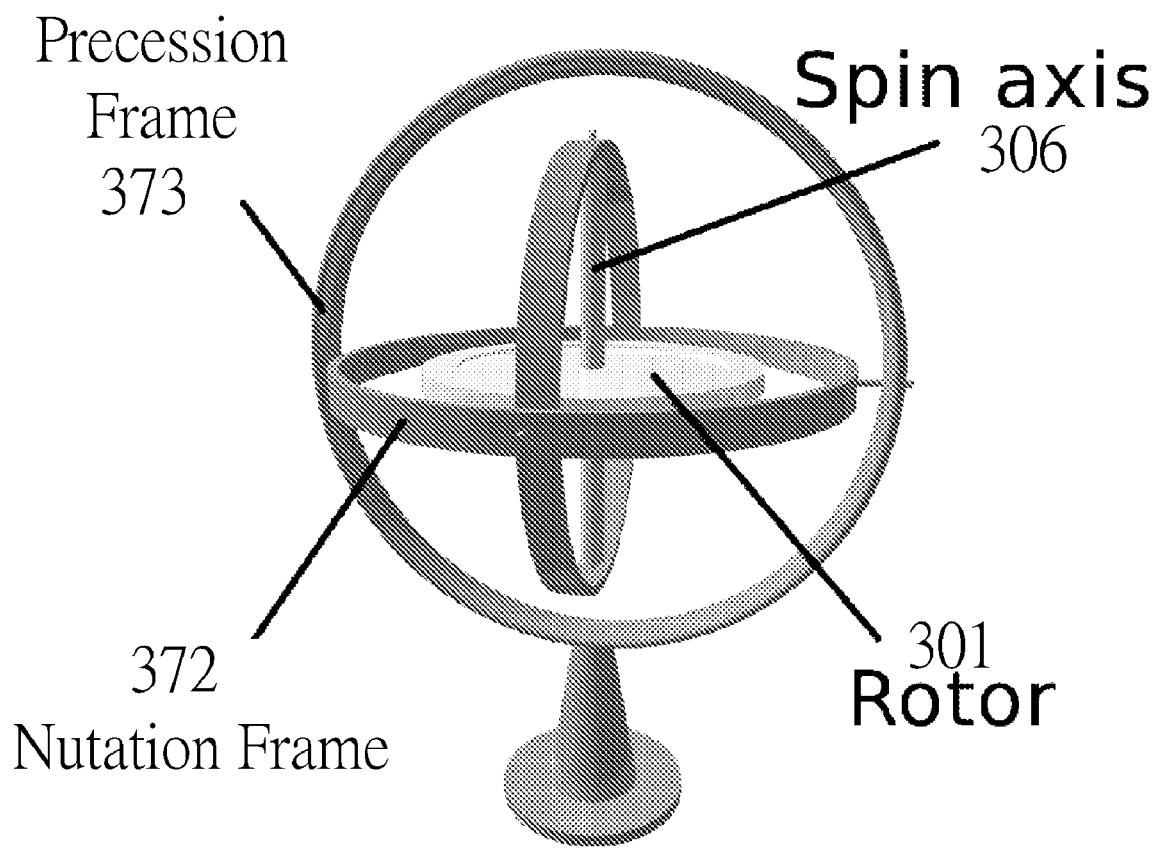
FIG. 3 has shown a typical gyroscope.

FIG. 2 has shown the present invention "a mechanical flow battery" or simply "flow battery" in cross view. The mechanical flow battery comprises a flywheel system 20, a nutation frame 272 and a precession frame 273 which is mounted on a vibration absorbent layer 288 to be isolated from any outside vibrations.

The flywheel system 20 of the mechanical flow battery comprises a rotor 201, a spinning axis 206, at least a permanent magnet shown by a number 207, a motor 202, a housing 213, at least a conductive coil shown by a number 249, a plurality of bearings shown by a number 210, an air-powered motor 205, a gear box 204 and an one-way clutch 203.

The rotor 201 and the permanent magnet or magnets 207 fix with the spinning axis 206 which is positioned by the bearings 210 disposed on the housing 213. The rotor 201 and the permanent magnet or magnets 207 rotate when the spinning axis 206 rotates. The motor 202, the conductive coil or coils 249, the bearings 213, the gear box 204, the one-way clutch 203 and the air-powered motor 205 are fixed with the housing 213. The motor 202 and the air-powered motor 205 are for spinning the spinning axis 206 in which the motor 202 can be any type of motor other than the type of the air-powered motor 205. The air-powered motor 205 stands for a type of motor driven by air flowing it. The motor 202 and the air-powered motor 205 are for driving the spinning axis 206 and both motors might go thru a gear box and an one-way clutch to the spinning axis 206. The existence of gear box is for compensating the differences between the driving motor and the driven spinning axis, for example, the differences could be their sizes of the spinning things, their speeds or even their centerings. The one-way clutch is used to let a driving motor spin the spinning axis and prohibit the spinning axis from spinning the driving motor. The gear box and the one-way clutch can be neglected if they are not needed. The gear box and one-way clutch for both the motor 202 and air-powered motor 205 should fix with the housing 213 if they are needed. FIG. 2 has only shown the gear box 204 and the one-way clutch 203 for the air-powered motor 205 but that for the motor 202 are not shown. The air-powered motor 205 is used to spin the spinning axis 206 by compressed air input, and an air input and exhausted air output on the air-powered motor 205 are seen in FIG. 2. The air source to the air-powered motor 205 can be a container filled with compressed air. Due to the extremely high rotating speed of the spinning axis 206 and in order to reduce the aerodynamic loss and frictional loss, inside the housing 213 containing the spinning axis 206 is always highly vacuumed, and the bearing 210 can be the noncontact, magnetic bearings.

The housing 213 couples the nutation frame 272 thru a nutation axis 2721 and the nutation frame 272 and the housing 213 can make revolving movement with each other around a nutation axis 2721 seen in FIG. 2. The nutation 272 couples the precession frame 273 thru a precession axis 2731 and the precession frame 273 and the nutation frame 272 can make revolving movement with each other around a precession axis 2731 which can also be seen in FIG. 2. The mechanical flow battery shown in FIG. 2 is mounted on a vibration absorbent layer to be isolated from any outside vibration. The couplings of the flywheel system 20, the nutation frame 272 and the precession frame 273 construct a structure of the gyroscope. The power input and output to the mechanical flow battery of FIG. 2, in one of the embodiment, can go thru the couplings of the housing 213, the nutation frame 272 and precession frame 273 electrically connected to the outside.

The status of the spinning axis 206 such as its phase of angle and frequency can be fed to the motor 202 and air-powered motor 205 for controlling purposes. The present invention is not limited to any particular motor 202, for example, one of the choice for the motor 202 is a switched reluctance motor. The present invention is not limited to any particular air-powered motor 205.

The rotor 201 and the permanent magnet or magnets 207 fixed with the spinning axis 206 should be symmetrical about the axis of the spinning axis 206 in weight, or in shape, or both in weight and in shape, due to its very high rotating speed.

The housing 213 including all its fixed things, the nutation frame 272 and the precession frame 273 should be respectively symmetrical about their rotating axis in weight, or in shape, or both in weight and in shape. A balance weight might be needed to balance any weight unbalance. A balance weight 209 is seen in FIG. 2 for reference.

The present invention is not limited to any particular shape of the rotor 201 and the housing 213. The permanent magnet or magnets 207 of FIG. 2 can also be realized by current flowing thru coil or coils. The present invention is not limited to any particular gear box and one-way clutch. The present invention is not limited to any particular nutation and precession frames.

Figure 4:
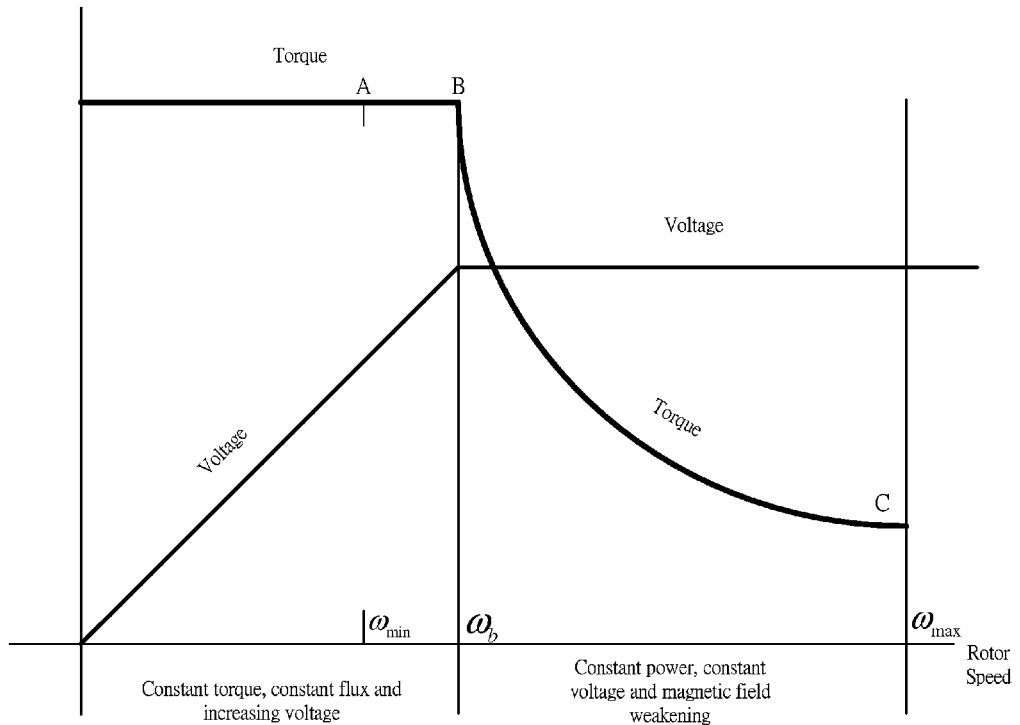
FIG. 4 has shown the characteristics of a typical flywheel.

FIG. 4 has shown the characteristics of a typical flywheel which includes the speed of the spinning axis versus the output voltage. FIG. 4 has shown that the rectified output voltage maintains almost constant for the speed of the spinning axis 206 between and. The embodiment of FIG. 2 includes two motors one of which is the motor 202 used to initially spin the spinning axis 206 to an expected speed, for example, and the other motor is the air-powered motor 205 for maintaining the speed of the spinning axis 206, for example, the speed maintained at a range between the and.

In the embodiment of FIG. 2, the spinning axis 206 can also be driven by only one motor which can be either the motor 202 or the air-powered motor 205.

Figure 5:
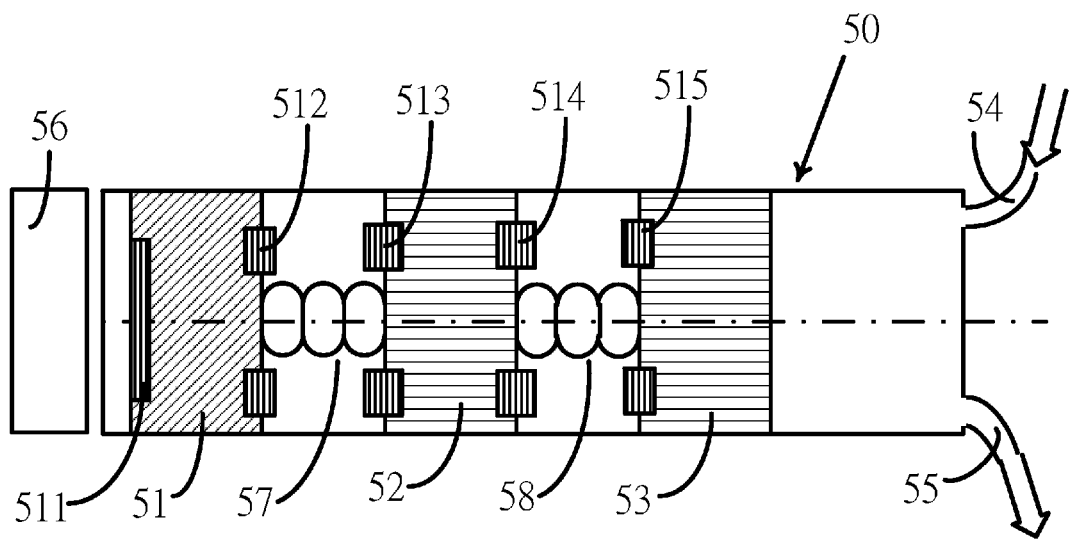
FIG. 5 has shown the structure of a variable-volume-controlled container in cross view.

The air source to the air-powered motor 205 of FIG. 2 can be a present invention "variable-volume-controlled container" or simply called as "container". The container can be in any shape and it comprises at least a piston inside whose shape conforms to that of the container in which the piston can make movement back and forth inside the container. For the convenience, a cylinder-shaped "variable-volume-controlled container" in cross view is shown in FIG. 5.

The container 50 comprises a first piston 51, a first honey-cored piston 52, a second honey-cored piston 53, a first spring 57, a second spring 58, a plurality of permanent magnets, a first excitation field 56, an air inlet 54, and an air outlet 55. The piston 51, 52 and 53 are allowed to make movements inside the container 50 and the first and second honey-cored pistons 52, 53 are respectively built with a plurality of air passages penetrating them so that air can flow thru those air passages to keep almost identical air pressure at two sides of each honey-cored piston. The first excitation field 56 is for generating magnetic poles. Each piston is disposed with at least a permanent magnet. A first permanent magnet 511 is disposed on one side of the first piston 51 and a second permanent magnets 512 is disposed on the other opposite side of the first piston 51. A third and fourth permanent magnets 513, 514 are respectively disposed on two sides of the first honey-cored piston 52. And, a fifth permanent magnet 515 is disposed on a side of the second honey-cored piston 53 facing the first honey-cored piston 52. The three pistons 51, 52 and 53 are respectively interconnected by the first and second springs respectively shown as 57 and 58. The polarity of the magnet on a side of a piston should be same as that of the magnet of its neighboring piston to generate a repelling force between the two pistons, which can be seen as the second magnet 512 versus the third magnet 513 with the same polarities and the fourth magnet 514 versus the fifth magnet 515 with the same polarities. The first piston 51 is located at a further end inside the container 50, and the first excitation field 56 is disposed outside the container 50 but close to the first piston 51. The first excitation field 56 is for generating two magnetic poles which will work with the first magnet 511 on the first piston 51 so that the first piston 51 can be pushed away or pulled back inside the container 50. When the first piston 51 is pushed away by the magnetic field generated by the outside first excitation field 56 then the first piston 51 will push the first honey piston 52 which will then push the second honey piston 53 so that the air pressure in the container becomes larger due to the volume becomes smaller. And when the magnetic polarity of the magnetic field of the first excitation field 56 changes, the pushed-away first piston 51 will be pulled back by the forces which includes the magnetic attractions between the first magnet 511 and outside magnetic field, the air pressure inside the container and the responses of the springs 57, 58. To prevent the first piston 51 is pushed away too far from its original location a limitor might be used. A limitor 533 is seen in FIG. 5 to restrict the first piston only moving in a certain range. With a suitably selected frequency of the first excitation field 56, the pistons moves back and forth inside the container so that an expected waves of compressed air inside the container can be achieved. The container can be placed at any angle such as horizontally or vertically, and if the container is placed vertically, the gravity factor should be taken into consideration.

The existence of the honey-cored pistons 52 and 53 are for pumping air further into the container. If the container is not deep or they are not needed then the honey-cored piston can be neglected. The present invention is not limited to any particular number of the honey-cored pistons, which depends on the depth of the container and how far the pistons you like it to reach.

The present invention is not limited to any particular number and the shape of the permanent magnets. The present invention is not limited to any particular type of the spring.

The status of the compressed air inside the container can be fed back to the first excitation field for controlling purposes.

Figure 6:
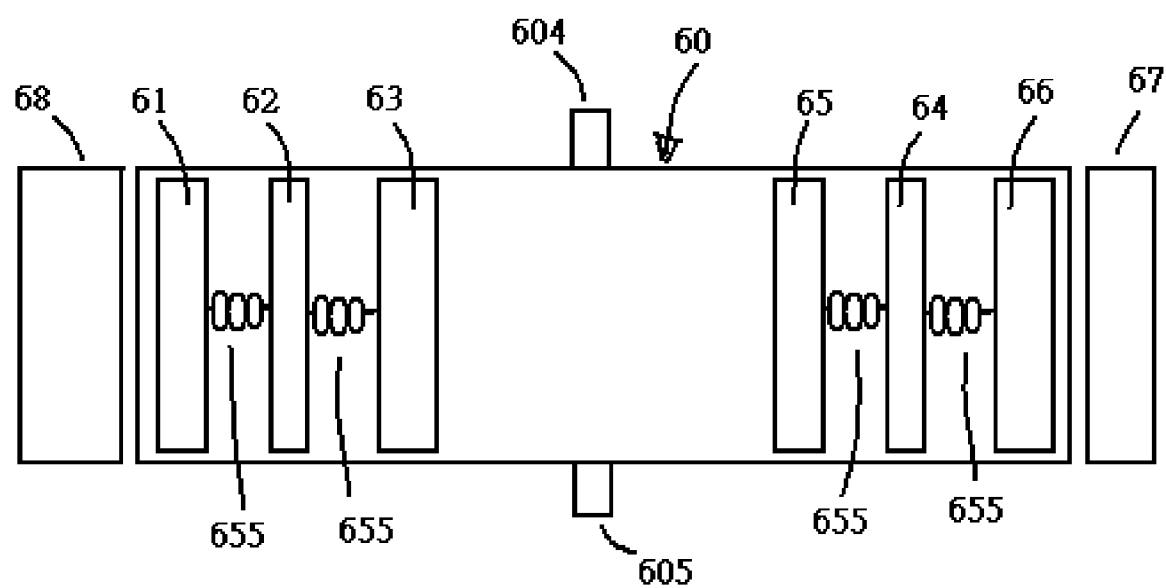
FIG. 6 has shown the structure of another variable-volume-controlled container in cross view.

The structure of the embodiment of FIG. 5 can be applied to the both ends of the container. FIG. 6 has shown a first excitation field 68, a first piston 61, a first honey-cored piston 62 and a second honey-cored piston 63 at the left end, and, a second excitation field 67, a second piston 66, a third honey-cored piston 64 and a fourth honey-cored piston 65 at the right end. An air inlet and an air outlet can be disposed at any suitable place between the two ends of the container. The embodiment of FIG. 6 has shown the air inlet 604 and air outlet 605 are disposed in the middle of the container 60. A plurality of springs 655 are seen in the drawing for interconnecting the pistons. When with both the excitation fields working at same time, a larger air pressure inside the container can be obtained.

What is claimed is:

1. A mechanical flow battery comprising:
    a spinning axis;
    a rotor fixed with the spinning axis;
    at least a permanent magnet fixed with the spinning axis;
    a plurality of bearings for positioning the spinning axis;
    a first motor for spinning the spinning axis;
    a first gear box for compensating the differences between the first motor and the spinning axis;
    a first one-way clutch for letting the first motor spin the spinning axis and prohibiting the spinning axis from spinning the first motor;
    at least a conductive coil for providing output;
    a housing coupled with the spinning axis, wherein the housing contains the spinning axis, the rotor and the permanent magnet or magnets, and the first motor, the first gear box, the first one-way clutch, the conductive coil or coils and a plurality of the magnetic bearings are fixed with the housing;
    a precession frame; and
    a nutation frame respectively coupled with the housing and the precession frame, wherein the nutation frame and the housing make revolving movement with each other and the nutation frame and the precession frame make revolving movement with each other.

2. The mechanical flow battery of claim 1, wherein the first motor is air-powered motor.

3. The mechanical flow battery of claim 2, further comprising a second motor which is any motor other than the type of air-powered motor for spinning the spinning axis, a second gear box and a second one-way clutch, wherein the second motor, the second gear box and the second one-way clutch are fixed with the housing, and the second motor goes thru the second gear box and the second one-way clutch to the spinning axis, and the second gear box and the second one-way clutch can be neglected if they are needed.

4. The flow battery of claim 1, wherein the permanent magnet or magnets are realized by current flowing thru coil or coils.

5. The flow battery of claim 2, wherein the permanent magnet or magnets are realized by current flowing thru coil or coils.

6. The flow battery of claim 3, wherein the permanent magnet or magnets are realized by current flowing thru coil or coils.

7. The flow battery of claim 1, wherein the status of the spinning axis is fed back to the first motor for controlling the speed of the spinning axis.

8. The flow battery of claim 2, wherein the status of the spinning axis is fed back to the air-powered motor for controlling the speed of the spinning axis.

9. The flow battery of claim 3, wherein the status of the spinning axis is fed back to both the air-powered motor and the motor for controlling the speed of the spinning axis.

10. The flow battery of claim 1, wherein the bearings are magnetic bearings.

11. The flow battery of claim 2, wherein the bearings are magnetic bearings.

12. The flow battery of claim 3, wherein the bearings are magnetic bearings.

13. The mechanical flow battery of claim 3, wherein either one motor is for initially driving the spinning axis to an expected speed range, and the other one motor is for maintaining the spinning axis at an expected speed range.

14. The mechanical flow battery of claim 3, wherein the two motors spin the spinning axis at the same time.

\* \* \* \* \*